(12) United States Patent
Griot et al.

(10) Patent No.: US 9,374,749 B2
(45) Date of Patent: Jun. 21, 2016

(54) METHODS AND SYSTEMS USING SAME BASE STATION CARRIER HANDOFF FOR MULTICARRIER SUPPORT

(75) Inventors: Miguel Griot, Huntington Beach, CA (US); Ayman F. Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 872 days.

(21) Appl. No.: 12/396,448

(22) Filed: Mar. 2, 2009

(65) Prior Publication Data

US 2010/0124201 A1 May 20, 2010

Related U.S. Application Data

(60) Provisional application No. 61/115,015, filed on Nov. 14, 2008.

(51) Int. Cl.
*H04W 36/06* (2009.01)
*H04L 5/00* (2006.01)
*H04W 36/38* (2009.01)

(52) U.S. Cl.
CPC ............. *H04W 36/06* (2013.01); *H04L 5/0007* (2013.01); *H04L 5/0096* (2013.01); *H04W 36/38* (2013.01)

(58) Field of Classification Search
CPC .................................................... H04W 36/06
USPC ............................ 370/331–334; 455/436–444
See application file for complete search history.

(56) References Cited

U.S. PATENT DOCUMENTS

| | | | |
|---|---|---|---|
| 5,950,125 A * | 9/1999 | Buhrmann et al. ......... | 455/432.1 |
| 6,078,571 A * | 6/2000 | Hall .............................. | 370/331 |
| 2005/0124345 A1* | 6/2005 | Laroia et al. ................... | 455/437 |
| 2005/0202821 A1* | 9/2005 | Pischella ....................... | 455/436 |
| 2006/0221883 A1* | 10/2006 | Damnjanovic et al. ....... | 370/315 |
| 2008/0233963 A1* | 9/2008 | Alanara et al. ................ | 455/438 |

(Continued)

FOREIGN PATENT DOCUMENTS

| CN | 101185278 A | 5/2008 |
|---|---|---|
| EP | 1811699 A1 | 7/2007 |
| EP | 1871128 | 12/2007 |

(Continued)

OTHER PUBLICATIONS

IEEE 802 16 Task Group E: "Part 16: Air Interface for Fixed and Mobile Broadband Wireless Access Systems—Amendment for Physical and Medium Access Control Layers for Combined Fixed and Mobile Operation in Licensed Bands" Internet Citation Dec. 9, 2003, XP003007019.
International Search Report and Written Opinion—PCT/US2009/064323—International Search Authority, European Patent Office, Jun. 28, 2010.
Leiba, et al., "Enhancements to fast feedback sub-channel", Internet Citation Apr. 28, 2004, XP002459060 Retrieved from the Internt: URL:http:www.1eee802.org16tgdcontri b C80216d-04_87.pdf.

(Continued)

*Primary Examiner* — Hassan Kizou
*Assistant Examiner* — Ashil Farahmand

(57) ABSTRACT

Certain embodiments of the present disclosure provide a method for switching radio frequency (RF) carriers that serve communication between a base station (BS) and a mobile station (MS). The switching of carriers can be viewed as a handoff procedure between two different RF carriers within the same BS. A simplified handoff procedure for switching of RF carriers can be applied when the MS switches its physical connection from a primary RF carrier to a secondary RF carrier, as well as in the case when the BS decides to move the MS from one primary RF carrier to another primary RF carrier.

52 Claims, 7 Drawing Sheets

(56) References Cited

U.S. PATENT DOCUMENTS

2009/0232093 A1* 9/2009 Lecompte .................. 370/331
2009/0310563 A1* 12/2009 Chou et al. ................ 370/331

FOREIGN PATENT DOCUMENTS

| | | | |
|---|---|---|---|
| JP | 2004282792 | A | 10/2004 |
| JP | 2005006337 | A | 1/2005 |
| JP | 2008502272 | A | 1/2008 |
| WO | WO-2007043601 | A1 | 4/2007 |
| WO | WO2007111415 | A1 | 10/2007 |
| WO | WO2008112682 | | 9/2008 |

OTHER PUBLICATIONS

Wang X., et al., "UL Fast-feedback Channel Index Shifting", Jul. 10, 2008, IEEE C80216m-08/288r3, XP017616574.

Taiwan Search Report—TW098138620—TIPO—Nov. 27, 2012.

Zhang R., et al., "Intra-BS Carrier Handover for IEEE802.16m," IEEE 802.16 Broadband Wireless Access Working Group, Sep. 5, 2008, IEEE C802.16m-08/949r3, URL, http://www.ieee802.org/16/tgm/contrib/C80216m-08_949r3.doc.

* cited by examiner

METHODS AND SYSTEMS USING SAME BASE STATION CARRIER HANDOFF FOR MULTICARRIER SUPPORT

PRIORITY CLAIM

This application claims the benefit of priority from U.S. Provisional Patent Application Ser. No. 61/115,015, filed Nov. 14, 2008 and entitled "Same Base Station Carrier Handoff for Multicarrier Support," which is assigned to the assignee of this application and is fully incorporated herein by reference for all purposes.

TECHNICAL FIELD

The present disclosure generally relates to wireless communication systems and more specifically to a method for switching radio frequency carriers.

SUMMARY

Certain embodiments of the present disclosure provide a method for switching from an old radio frequency (RF) carrier to a new RF carrier in a wireless communication system. The method generally includes transmitting, to a mobile station (MS), a first message indicating a handoff to the new RF carrier (CARRIER_HO_ID message) using the old RF carrier, receiving a first acknowledgement message sent from the MS using the old RF carrier to acknowledge successful reception of the CARRIER_HO_ID message at the MS, transmitting a second message (ALLOC_NEWCARR message) to allocate resources to the MS in the new RF carrier and to allocate resources in an uplink fast feedback channel, and receiving a second acknowledgement message, sent from the MS via the uplink fast feedback channel, to acknowledge successful synchronization to the new RF carrier.

Certain embodiments of the present disclosure provide a method for switching from an old radio frequency (RF) carrier to a new RF carrier in a wireless communication system. The method generally includes receiving, from a base station (BS), a message (CARRIER_HO_ID message) indicating a handoff to a new RF carrier and transmitted using the old RF carrier, transmitting a first acknowledgement message to the BS using the old RF carrier to acknowledge successful reception of the CARRIER_HO_ID message, receiving a message (ALLOC_NEWCARR message) sent from the BS using the old RF carrier for allocation of resources in the new RF carrier and for allocation of resources in an uplink fast feedback channel, and transmitting a second acknowledgement message via the uplink fast feedback channel to acknowledge successful synchronization process to the new RF carrier.

Certain embodiments of the present disclosure provide an apparatus for switching from an old radio frequency (RF) carrier to a new RF carrier in a wireless communication system. The apparatus generally includes logic for transmitting, to a mobile station (MS), a first message indicating a handoff to the new RF carrier (CARRIER_HO_ID message) using the old RF carrier, logic for receiving a first acknowledgement message sent from the MS using the old RF carrier to acknowledge successful reception of the CARRIER_HO_ID message at the MS, logic for transmitting a second message (ALLOC_NEWCARR message) to allocate resources to the MS in the new RF carrier and to allocate resources in an uplink fast feedback channel, and logic for receiving a second acknowledgement message, sent from the MS via the uplink fast feedback channel, to acknowledge successful synchronization to the new RF carrier.

Certain embodiments of the present disclosure provide an apparatus for switching from an old radio frequency (RF) carrier to a new RF carrier in a wireless communication system. The apparatus generally includes logic for receiving, from a base station (BS), a message (CARRIER_HO_ID message) indicating a handoff to a new RF carrier and transmitted using the old RF carrier, logic for transmitting a first acknowledgement message to the BS using the old RF carrier to acknowledge successful reception of the CARRIER_HO_ID message, logic for receiving a message (ALLOC_NEWCARR message) sent from the BS using the old RF carrier for allocation of resources in the new RF carrier and for allocation of resources in an uplink fast feedback channel, and logic for transmitting a second acknowledgement message via the uplink fast feedback channel to acknowledge successful synchronization process to the new RF carrier.

Certain embodiments of the present disclosure provide an apparatus for switching from an old radio frequency (RF) carrier to a new RF carrier in a wireless communication system. The apparatus generally includes means for transmitting, to a mobile station (MS), a first message indicating a handoff to the new RF carrier (CARRIER_HO_ID message) using the old RF carrier, means for receiving a first acknowledgement message sent from the MS using the old RF carrier to acknowledge successful reception of the CARRIER_HO_ID message at the MS, means for transmitting a second message (ALLOC_NEWCARR message) to allocate resources to the MS in the new RF carrier and to allocate resources in an uplink fast feedback channel, and means for receiving a second acknowledgement message, sent from the MS via the uplink fast feedback channel, to acknowledge successful synchronization to the new RF carrier.

Certain embodiments of the present disclosure provide an apparatus for switching from an old radio frequency (RF) carrier to a new RF carrier in a wireless communication system. The apparatus generally includes means for receiving, from a base station (BS), a message (CARRIER_HO_ID message) indicating a handoff to a new RF carrier and transmitted using the old RF carrier, means for transmitting a first acknowledgement message to the BS using the old RF carrier to acknowledge successful reception of the CARRIER_HO_ID message, means for receiving a message (ALLOC_NEWCARR message) sent from the BS using the old RF carrier for allocation of resources in the new RF carrier and for allocation of resources in an uplink fast feedback channel, and means for transmitting a second acknowledgement message via the uplink fast feedback channel to acknowledge successful synchronization process to the new RF carrier.

Certain embodiments of the present disclosure provide a computer-program product for switching from an old radio frequency (RF) carrier to a new RF carrier in a wireless communication system, comprising a computer readable medium having instructions stored thereon, the instructions being executable by one or more processors. The instructions generally include instructions for transmitting, to a mobile station (MS), a first message indicating a handoff to the new RF carrier (CARRIER_HO_ID message) using the old RF carrier, instructions for receiving a first acknowledgement message sent from the MS using the old RF carrier to acknowledge successful reception of the CARRIER_HO_ID message at the MS, instructions for transmitting a second message (ALLOC_NEWCARR message) to allocate resources to the MS in the new RF carrier and to allocate resources in an uplink fast feedback channel, and instructions for receiving a second acknowledgement message, sent from the MS via the uplink fast feedback channel, to acknowledge successful synchronization to the new RF carrier.

Certain embodiments of the present disclosure provide a computer-program product for switching from an old radio frequency (RF) carrier to a new RF carrier in a wireless communication system, comprising a computer readable medium having instructions stored thereon, the instructions being executable by one or more processors. The instructions generally include instructions for receiving, from a base station (BS), a message (CARRIER_HO_ID message) indicating a handoff to a new RF carrier and transmitted using the old RF carrier, instructions for transmitting a first acknowledgement message to the BS using the old RF carrier to acknowledge successful reception of the CARRIER_HO_ID message, instructions for receiving a message (ALLOC_NEWCARR message) sent from the BS using the old RF carrier for allocation of resources in the new RF carrier and for allocation of resources in an uplink fast feedback channel, and instructions for transmitting a second acknowledgement message via the uplink fast feedback channel to acknowledge successful synchronization process to the new RF carrier.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
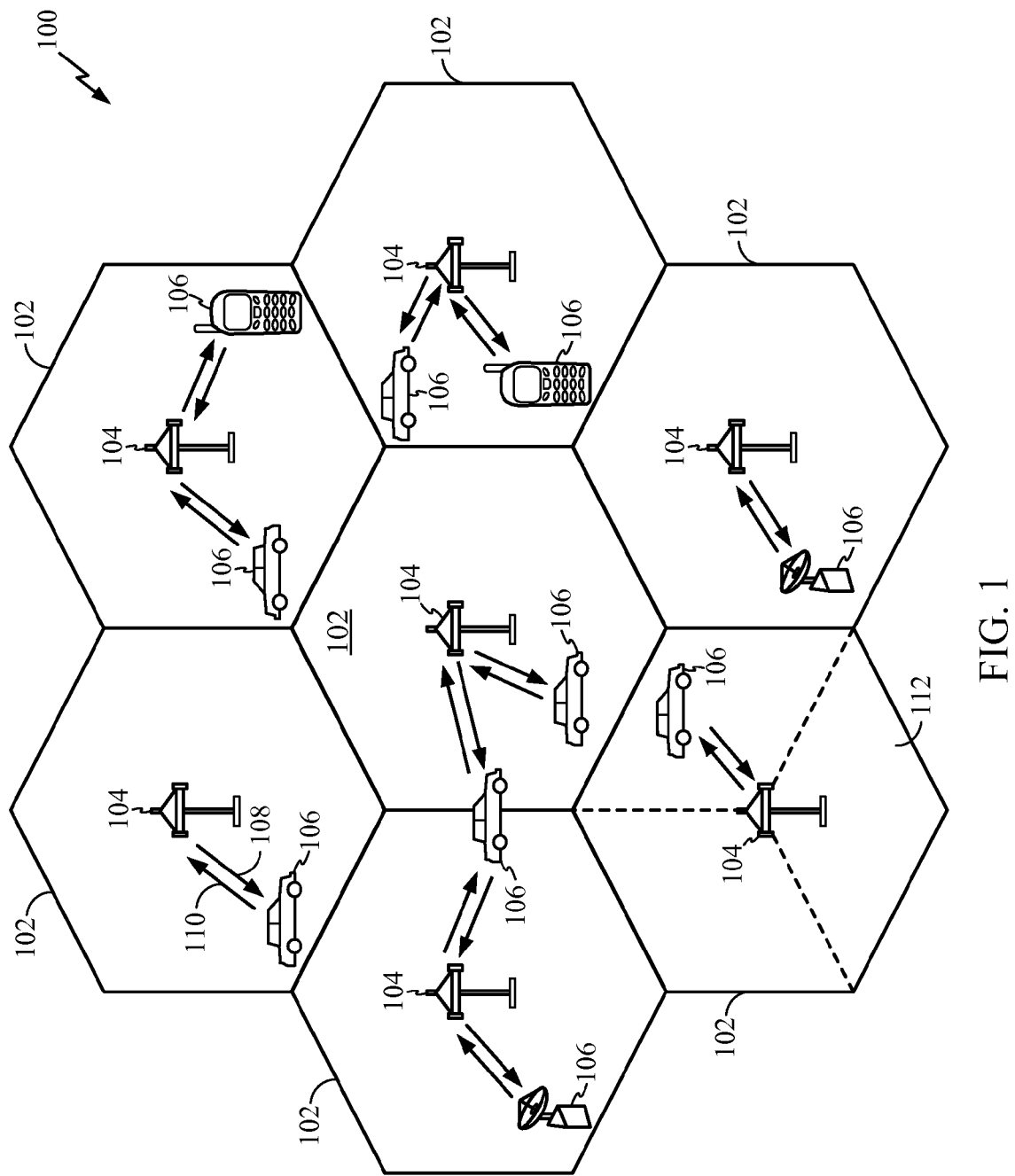
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

The Institute of Electrical and Electronics Engineers (IEEE) 802.16m standard supports a communication between a base station (BS) and a mobile station (MS) using multiple radio frequency (RF) carriers. Each MS can be controlled by only one RF carrier (i.e., a primary carrier), and may transmit or receive data on one or more secondary carriers. Different mobile stations served by the same BS may have different primary RF carriers.

The IEEE 802.16m standard defines a multi-carrier operation referred to as carrier switching, which can be beneficial in the case of a single-radio MS. The single-radio MS may switch its physical layer (PHY) connection from the primary carrier to the secondary carrier as instructed by the BS and may lose the PHY connection to the primary carrier. Moreover, the BS may decide to move the MS to a different primary carrier. This particular procedure can be viewed as a handoff procedure between two different RF carriers within the same serving BS.

Certain embodiments of the present disclosure support a method to efficiently switch RF carriers with a small controlling overhead.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
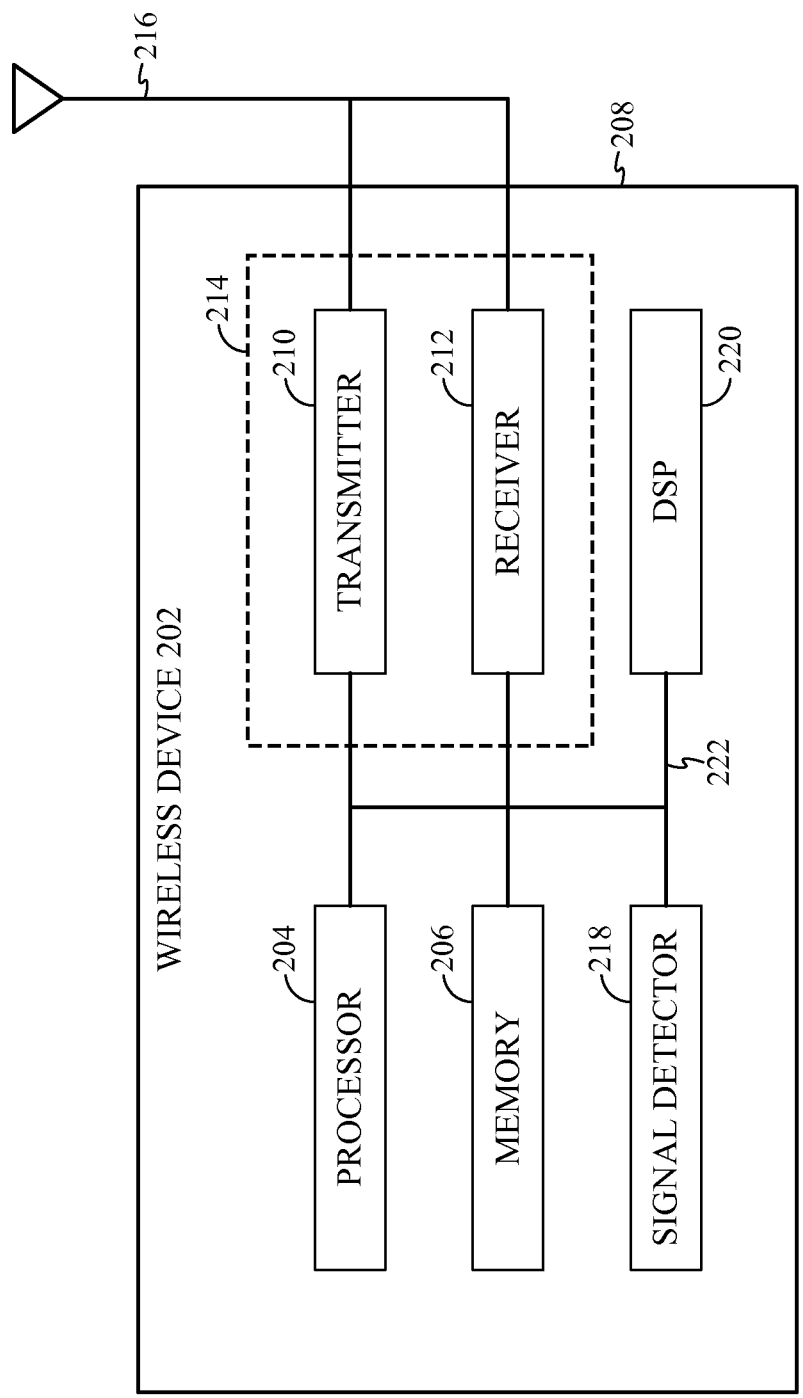
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
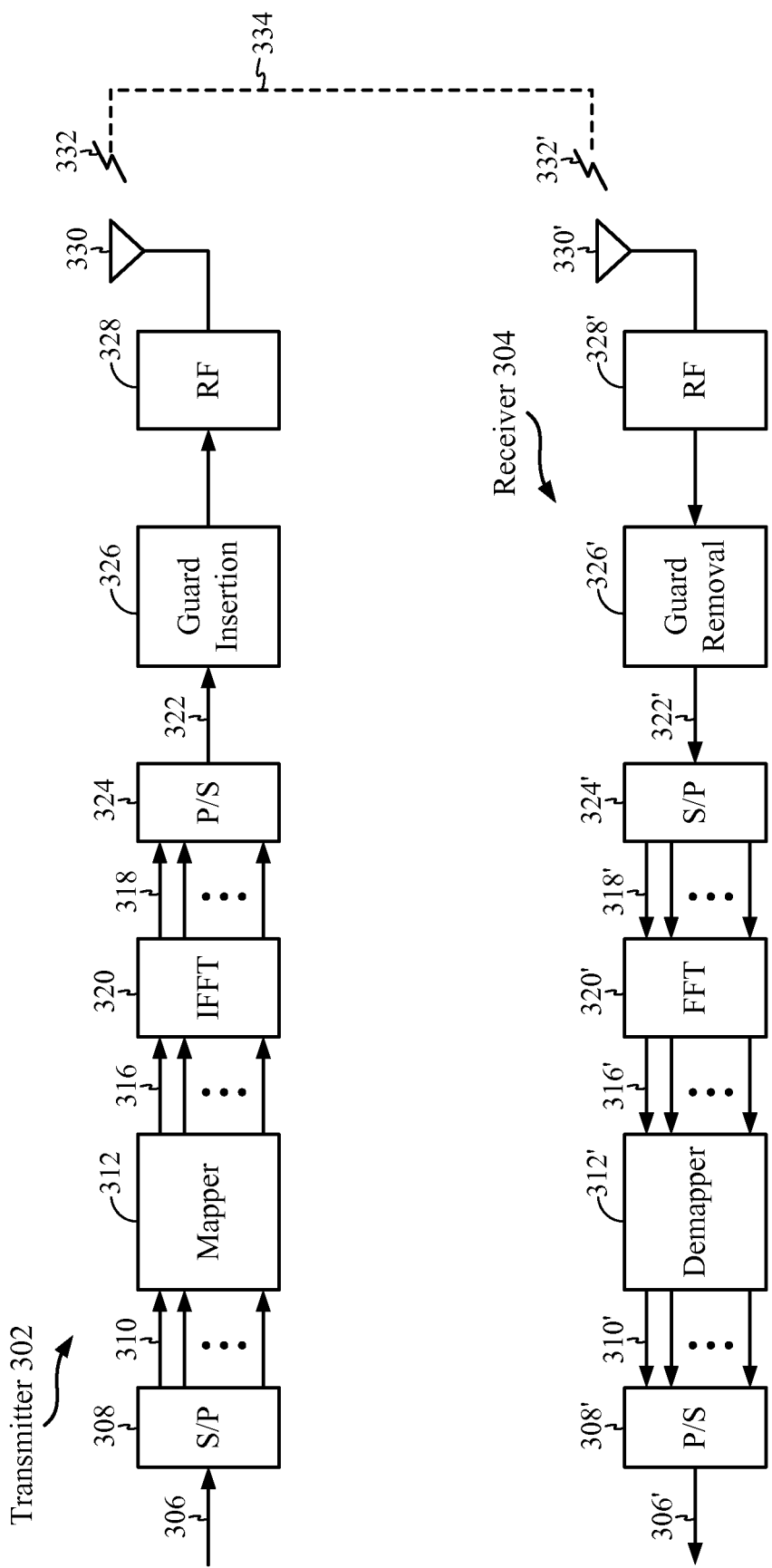
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Multi-Carrier Control Structure

The IEEE 802.16m standard supports a communication between a base station (BS) and a mobile station (MS) utilizing multiple radio frequency (RF) carriers. Each MS can be controlled by only one RF carrier (i.e., a primary RF carrier), and may transmit or receive data on one or more secondary RF carriers. Different mobile stations served by the same BS may have different primary RF carriers.

RF carriers of a multi-carrier system may be configured as fully configured carriers and partially configured carriers. A fully configured RF carrier is a carrier for which all control channels including a synchronization channel (SUCH), a broadcast channel (BCH), a multicast and a unicast control signaling can be configured. Information and parameters regarding multi-carrier operations can be included in the control channels. On the other hand, a partially configured RF carrier is a carrier dedicated for only essential control channel configuration in order to support traffic exchanges.

From the point of view of mobile stations, the RF carriers involved in a multi-carrier system can be divided into two types: primary carriers and secondary carriers. A primary RF carrier may be used to exchange traffic and PHY/MAC (physical layer/media access control) control information. Also, the primary RF carrier may be utilized for control functions, such as a network entry, and it may be fully configured. Each MS can have only one primary RF carrier. On the other hand, a secondary RF carrier is additional carrier that the MS may use for traffic, and only if the secondary RF carrier is specified by the BS, which may be typically achieved via the primary RF carrier. The secondary RF carrier may also include control signaling, and may be partially configured.

Exemplary Multi-Carrier Principles

The resource allocation to an MS may span the primary RF carrier and one or multiple secondary RF carriers. Some information about the secondary RF carrier (such as presence, location, etc) may be available to the MS through the primary RF carrier.

In the first scenario, all RF carriers in the system may be fully configured to operate standalone, and may support some users as their primary RF carriers and some other users as their secondary RF carriers. In the second scenario, partially configured supplementary RF carriers may be optimized as data pipes for certain services or traffic types with limited control signaling. These supplementary RF carriers cannot operate standalone.

Two different multi-carrier operations can be specified: a carrier aggregation and a carrier switching. The carrier aggregation operation assumes that the MS may always maintain PHY connection and monitor control information on its primary RF carrier, although it may also switch to a secondary RF carrier. In the case of a single-radio MS, the carrier switching operation can be applied assuming that the MS may switch its PHY connection from the primary to the secondary RF carrier after being instructed by a BS.

Exemplary Multi-Carrier Operation

Figure 4:
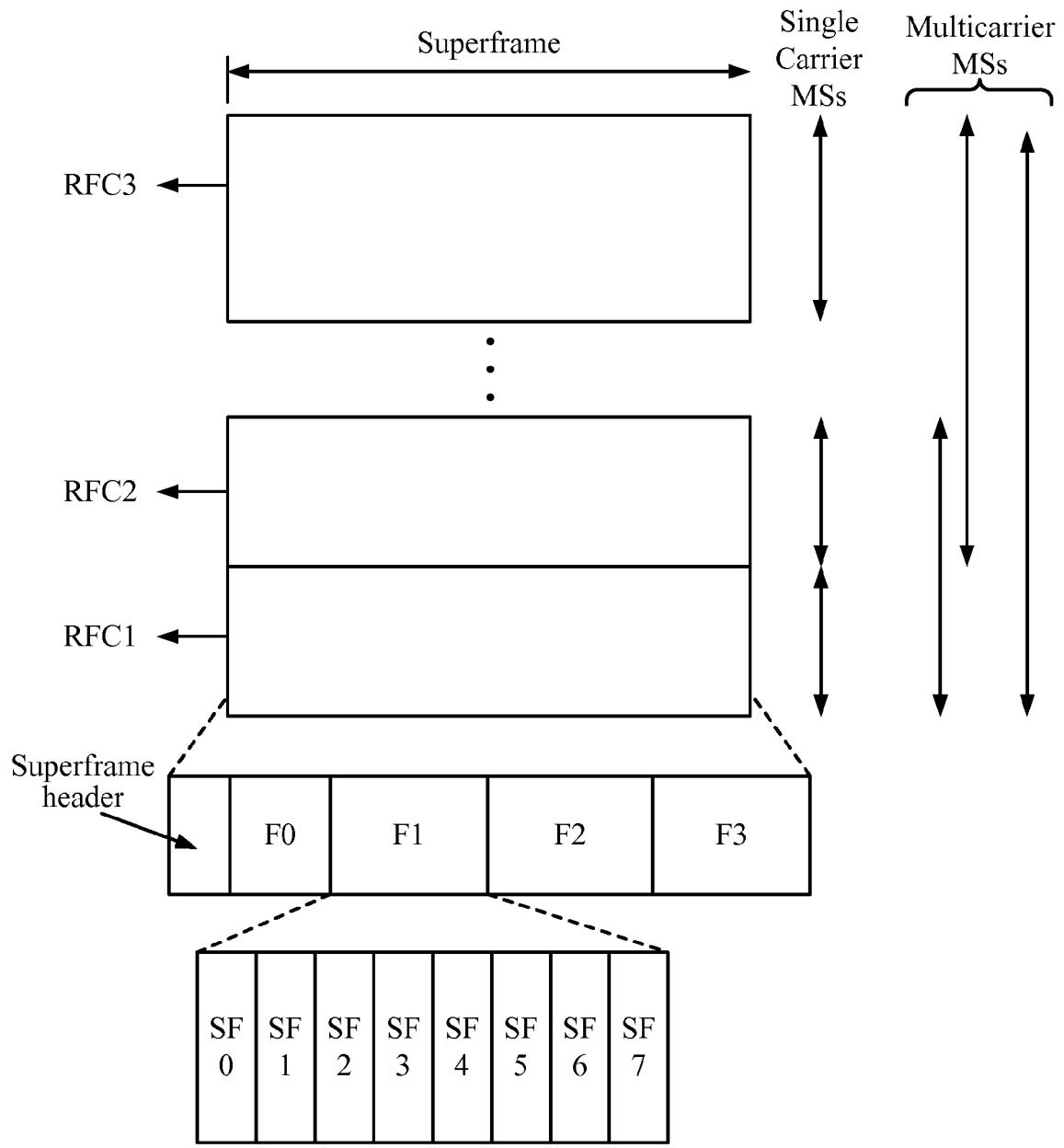
FIG. 4 illustrates frame structures of single-carrier and multi-carrier modes at mobile stations in accordance with certain embodiments of the present disclosure.

FIG. 4 illustrates frame structures employed at mobile stations that operate in a single-carrier mode and in a multi-carrier mode. It can be observed that the same frame structure may be utilized for communicating between a BS and an MS in both modes. FIG. 4 illustrates three different RF carriers: RFC1, RFC2 and RFC3. Each RF carrier may have its own synchronization channel (SUCH) and a super-frame header (SFH). Every super-frame may be composed of frames, such as frames F0, F1, F2 and F3 illustrated in FIG. 4. It is important to note that secondary RF carriers may use only part of the SFH. Furthermore, the RF carriers may be located in a contiguous or in a non-contiguous frequency spectrum.

Every frame may comprise a plurality of sub-frames, such as sub-frames SF0, SF1, . . . , SF7 illustrated in FIG. 4 as a part of the frame F1. Mobile stations that are in the single-carrier mode can utilize only one RF carrier, while mobile stations that are in the multi-carrier mode may utilize a plurality of RF carriers, as illustrated in FIG.

Exemplary Handoff Procedure for Carrier Switching

Certain embodiments of the present disclosure support simplified handoff procedure for switching of RF carriers that can be applied for a single-radio MS. The MS may switch its physical connection from a primary RF carrier to a secondary RF carrier, or a BS may decide to move the MS from one primary RF carrier to another primary RF carrier. Both of these procedures may be viewed as a handoff procedure between two different RF carriers within the same BS. The present disclosure addresses issue of switching RF carriers using a simplified handoff procedure aimed to reduce control overhead.

Figure 5:
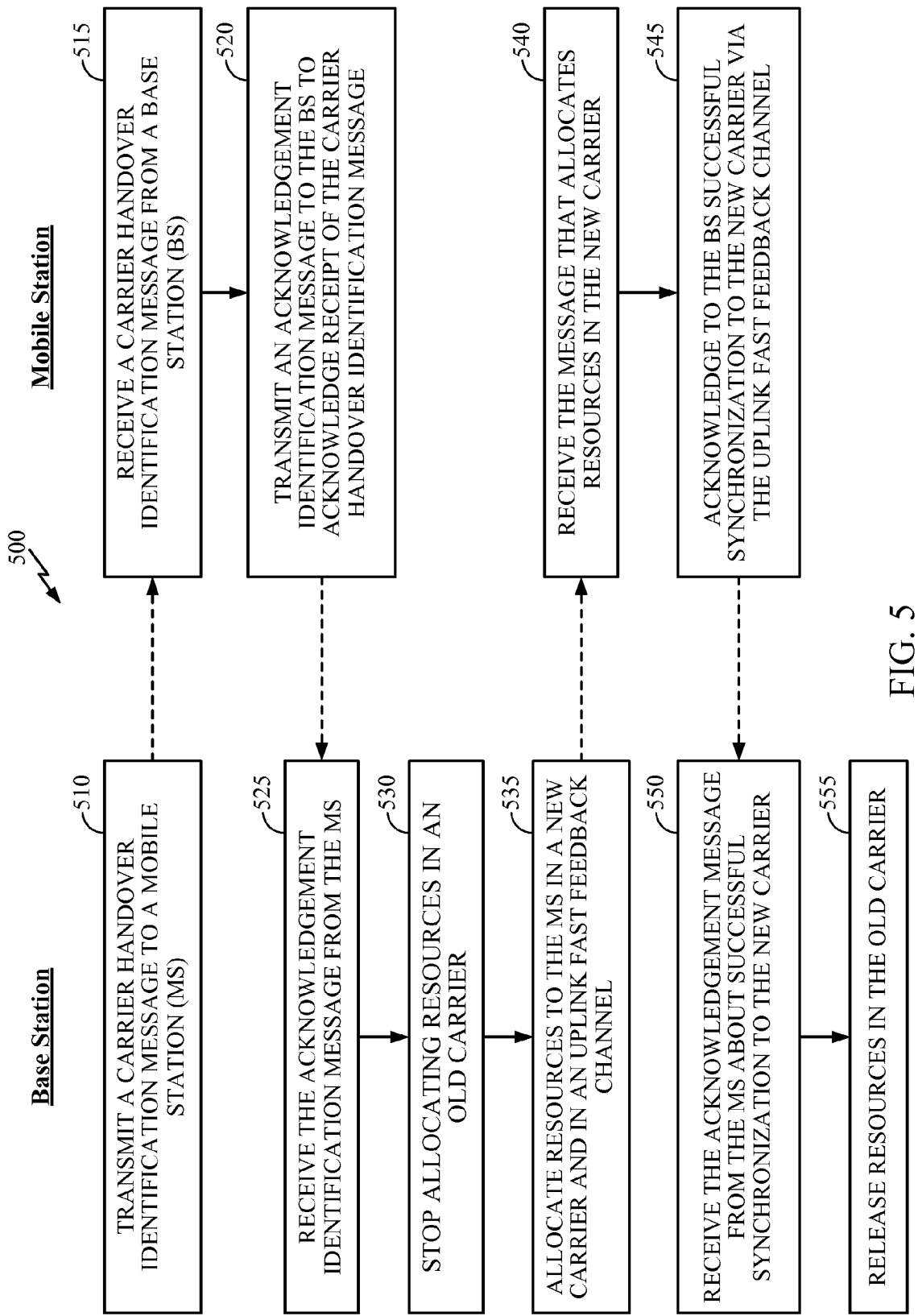
FIG. 5 illustrates example operations for switching of radio frequency (RF) carriers in a multicarrier system in accordance with certain embodiments of the present disclosure.
Figure 6:
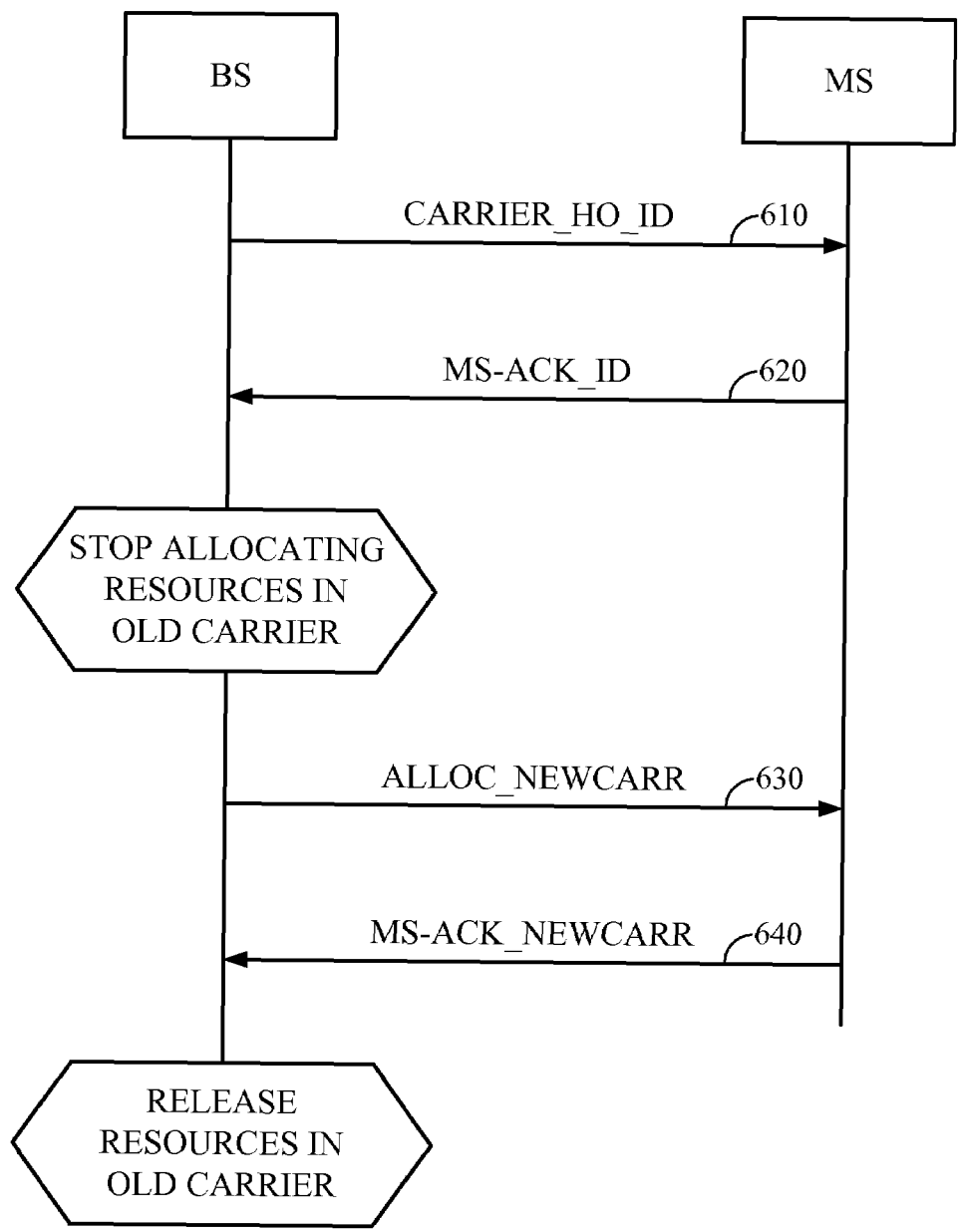
FIG. 6 illustrates exchanging control messages between a base station and a mobile station during the switching from one RF carrier to another RF carrier in accordance with certain embodiments of the present disclosure.

FIG. 5 illustrates example operations 500 for switching of RF carriers in a multi-carrier system. As illustrated, FIG. 5 provides operations performed by a serving BS, as well as corresponding operations performed by an MS being served. FIG. 6 illustrates an exchange of control messages between the serving BS and the MS during the switching procedure from one RF carrier to another, corresponding to the operations in FIG. 5.

At the beginning of the carrier handoff (HO) process, at 510, the BS may transmit a Carrier Handoff Identification (CARRIER_HO_ID) message 610 to the MS. At 515, the MS may receive the CARRIER_HO_ID message. The CARRIER_HO_ID may contain: a last frame in the current primary RF carrier before the MS attempts the carrier handoff, some necessary information about the switching RF carrier such as a carrier location, and additional information about the synchronization channel of a new primary RF carrier. Some of this information may have been previously transmitted by the BS, in which case it is not necessary to transmit them again. The BS may only include information that is different between the current primary RF carrier and the new RF carrier that the MS is handed off to. For example, if both RF carriers utilize a same cyclic prefix (CP), then the BS may not need to send any information about the CP, and the MS may assume that the new RF carrier utilizes the same CP.

At 520, the MS may acknowledge a receipt of the CARRIER_HO_ID 610 by sending a Mobile Station Acknowledgement Identification (MS-ACK_ID) message 620 to the BS. At 525, the BS may receive the MS-ACK_ID message from the MS. Following that, at 530, the BS may stop allocating resources in the old RF carrier. At 535, the BS may allocate resources to the MS in the new primary RF carrier by sending an Allocation New Carrier (ALLOC_NEWCARR) message 630 to the MS. The BS may also assign resources in a fast feedback uplink channel specified by the IEEE 802.16m standard for the MS to acknowledge that it has succeeded in the synchronization process to the new RF carrier. At 540, the MS may receive the ALLOC_NEWCARR message 630 from the BS.

Figure 5A:
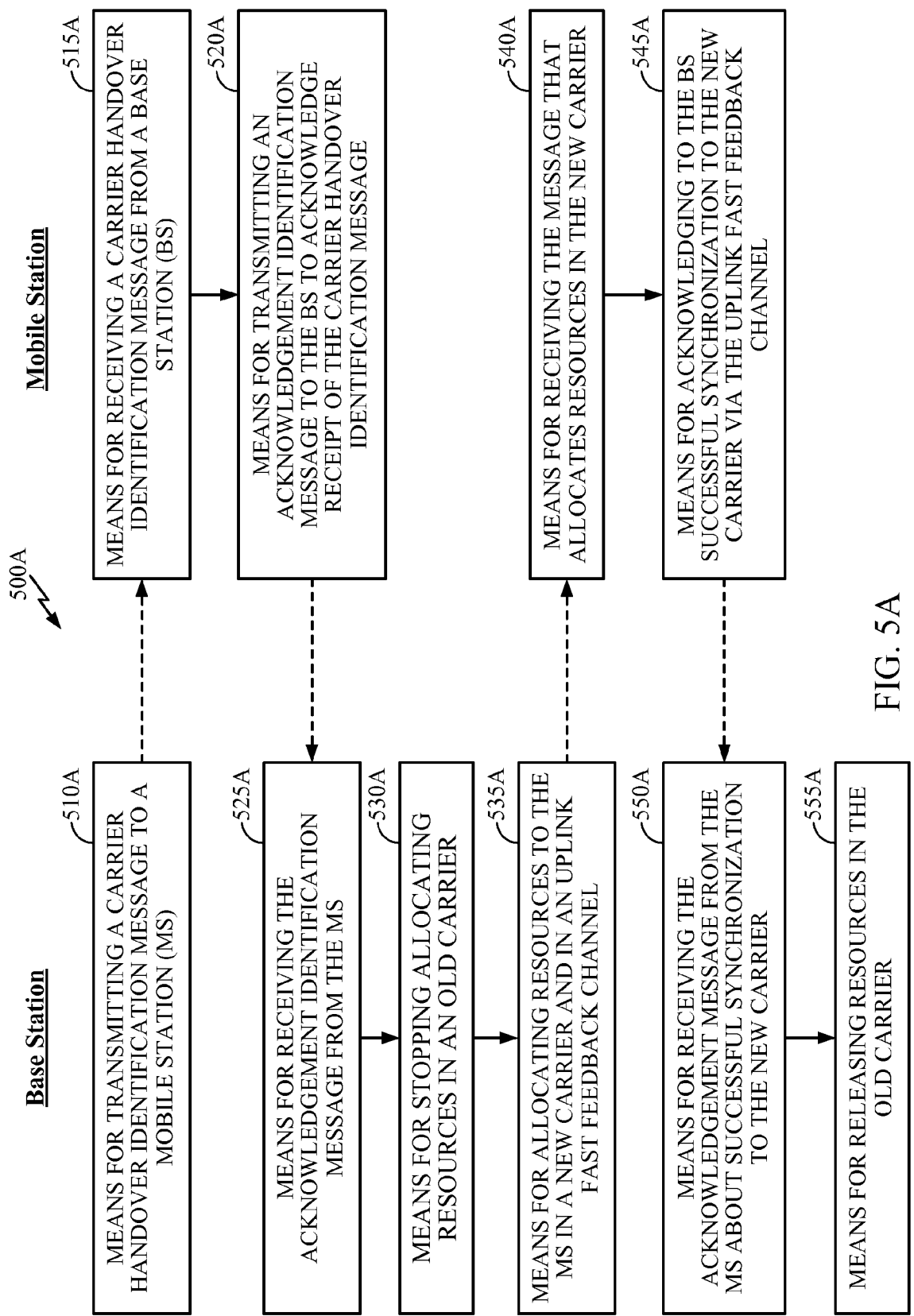
FIG. 5A illustrates example components capable of performing the operations illustrated in FIG. 5.

After a successful synchronization to the new RF carrier, using previously allocated resources of the fast feedback uplink channel, the MS may send to the BS a Mobile Station Acknowledgement New Carrier (MS-ACK_NEWCARR) message 640, at 545. Prior to receiving the acknowledgement message, the BS may maintain resource allocations in the old primary RF carrier for the MS in the case of any problem during the handoff process. At 550, the BS may receive the MS-ACK_NEWCARR message from the MS as a confirmation of successful synchronization to the new RF carrier. After that, at 555, the BS may release resources in the old RF carrier since they are not required The various operations of methods described above may be performed by various hardware and/or software component(s) and/or module(s) corresponding to means-plus-function blocks illustrated in the Figures. For example, blocks 510-555 illustrated in FIG. 5 correspond to means-plus-function blocks 510A-555A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for switching from a first primary radio frequency (RF) carrier to a second RF carrier in a wireless communication system, comprising:
    transmitting a first message to a mobile station (MS) using the first primary RF carrier, the first message indicating a handoff to the second RF carrier and including a second portion of necessary information for handoff from the first primary RF carrier to the second RF carrier,
    where the necessary information includes a first portion that has already been transmitted and the second portion that has not yet been transmitted;
    receiving a first acknowledgement message, sent from the MS using the first primary RF carrier, to acknowledge successful reception of the first message at the MS;
    transmitting a second message to the MS using the first primary RF carrier, wherein the second message allocates resources to the MS in the second RF carrier and allocates resources in an uplink fast feedback channel, the first primary RF carrier and the second RF carrier being carriers of a same base station (BS);
    maintaining resource allocations in the first primary RF carrier after transmitting the second message;
    receiving a second acknowledgement message, sent from the MS via the uplink fast feedback channel, to acknowledge successful synchronization to the second RF carrier; and
    releasing the maintained resource allocations in the first primary RF carrier in response to receiving the second acknowledgement message via the uplink fast feedback channel.

2. The method of claim 1, wherein the first message further comprises information about the second RF carrier and information about a synchronization channel of the second RF carrier.

3. The method of claim 2, wherein the information about the second RF carrier comprises a location of the second RF carrier in a frequency spectrum.

4. The method of claim 1, further comprising:
stopping allocating resources for the first primary RF carrier by the BS once the BS receives the first acknowledgement message from the MS about successful reception of the first message.

5. The method of claim 1, further comprising:
receiving at the BS a negative acknowledgement message sent from the MS using the first primary RF carrier to inform the BS about unsuccessful synchronization to the second RF carrier; and
continuing to maintain resource allocations for the first primary RF carrier in response to the negative acknowledgement message.

6. The method of claim 1, wherein the second RF carrier is a primary RF carrier.

7. The method of claim 1, wherein the second RF carrier is a secondary RF carrier.

8. A method for switching from a first primary radio frequency (RF) carrier to a second RF carrier in a wireless communication system, comprising:
receiving a first message, sent from a base station (BS) using the first primary RF carrier, indicating a handoff to the second RF carrier and including a second portion of necessary information for handoff from the first primary RF carrier to the second RF carrier,
where the necessary information includes a first portion that has already been received and the second portion that has not yet been received;
transmitting a first acknowledgement message to the BS using the first primary RF carrier to acknowledge successful reception of the first message;
receiving a second message sent from the BS using the first primary RF carrier, wherein the second message allocates resources in the second RF carrier and allocates resources in an uplink fast feedback channel, the first primary RF carrier and the second RF carrier being carriers of the BS;
synchronizing to the second RF carrier; and
transmitting a second acknowledgement message via the uplink fast feedback channel to acknowledge successful synchronization to the second RF carrier, wherein the resources allocated at the BS on the first primary RF carrier are released in response to the transmitted second acknowledgement message.

9. The method of claim 8, wherein the first message further comprises information about the second RF carrier and information about a synchronization channel of the second RF carrier.

10. The method of claim 9, wherein the information about the second RF carrier comprises a location of the second RF carrier in a frequency spectrum.

11. The method of claim 10, wherein the information about the second RF carrier comprises information that is different from information about the first primary RF carrier.

12. The method of claim 8, wherein the second RF carrier is a primary RF carrier.

13. The method of claim 8, wherein the second RF carrier is a secondary RF carrier.

14. An apparatus for switching from a first primary radio frequency (RF) carrier to a second RF carrier in a wireless communication system, comprising: memory; and a processor in communication with the memory, the processor configured to:
transmit a first message to a mobile station (MS) using the first primary RF carrier,
the first message indicating a handoff to the second RF carrier, and including a second portion of necessary information for handoff from the first primary RF carrier to the second RF carrier,
where the necessary information includes a first portion that has already been transmitted and the second portion that has not yet been transmitted;
receive a first acknowledgement message, sent from the MS using the first primary RF carrier, to acknowledge successful reception of the first message at the MS;
transmit a second message to the MS using the first primary RF carrier, wherein the second message allocates resources to the MS in the second RF carrier and allocates resources in an uplink fast feedback channel, the first primary RF carrier and the second RF carrier being carriers of a same base station (BS);
maintain resource allocations in the first primary RF carrier after transmitting the second message;
receive a second acknowledgement message, sent from the MS via the uplink fast feedback channel, to acknowledge successful synchronization to the second RF carrier; and
release the maintained resource allocations in the first primary RF carrier in response to receiving the second acknowledgement message via the uplink fast feedback channel.

15. The apparatus of claim 14, wherein the first message further comprises information about the second RF carrier and information about a synchronization channel of the second RF carrier.

16. The apparatus of claim 15, wherein the information about the second RF carrier comprises a location of the second RF carrier in a frequency spectrum.

17. The apparatus of claim 14, wherein the processor is configured to stop allocating resources for the first primary RF carrier by the BS once the BS receives the first acknowledgement message from the MS about successful reception of the first message.

18. The apparatus of claim 14, wherein the processor is configured to:
receive at the BS a negative acknowledgement message sent from the MS using the first primary RF carrier to inform the BS about unsuccessful synchronization to the second RF carrier; and
continue to maintain resource allocations for the first primary RF carrier in response to the negative acknowledgement message.

19. The apparatus of claim 14, wherein the second RF carrier is a primary RF carrier.

20. The apparatus of claim 14, wherein the second RF carrier is a secondary RF carrier.

21. An apparatus for switching from a first primary radio frequency (RF) carrier to a second RF carrier in a wireless communication system, comprising: memory; and a processor in communication with the memory, the processor configured to:
receive a first message, sent from a base station (BS) using the first primary RF carrier, indicating a handoff to the second RF carrier and including a second portion of necessary information for handoff from the first primary RF carrier to the second RF carrier, where the necessary information includes a first portion that has already been received and the second portion that has not yet been received;
transmit a first acknowledgement message to the BS using the first primary RF carrier to acknowledge successful reception of the first message;
receive a second message sent from the BS using the first primary RF carrier, wherein the second message allocates resources in the second RF carrier and allocates resources in an uplink fast feedback channel, the first primary RF carrier and the second RF carrier being carriers of the BS;
synchronize to the second RF carrier; and
transmit a second acknowledgement message via the uplink fast feedback channel to acknowledge successful synchronization to the second RF carrier, wherein the resources allocated at the BS on the first primary RF carrier are released in response to the transmitted second acknowledgement message.

22. The apparatus of claim 21, wherein the first message further comprises information about the second RF carrier and information about a synchronization channel of the second RF carrier.

23. The apparatus of claim 22, wherein the information about the second RF carrier comprises a location of the second RF carrier in a frequency spectrum.

24. The apparatus of claim 23, wherein the information about the second RF carrier comprises information that is different from information about the first primary RF carrier.

25. The apparatus of claim 21, wherein the second RF carrier is a primary RF carrier.

26. The apparatus of claim 21, wherein the second RF carrier is a secondary RF carrier.

27. An apparatus for switching from a first primary radio frequency (RF) carrier to a second RF carrier in a wireless communication system, comprising:
means for transmitting a first message to a mobile station (MS) using the first primary RF carrier, the first message indicating a handoff to the second RF carrier and including a second portion of necessary information for handoff from the first primary RF carrier to the second RF carrier,
where the necessary information includes a first portion that has already been transmitted and the second portion that has not yet been transmitted; and
means for receiving a first acknowledgement message, sent from the MS using the first primary RF carrier, to acknowledge successful reception of the first message at the MS;
means for transmitting a second message to the MS using the first primary RF carrier, wherein the second message allocates resources to the MS in the second RF carrier and allocates resources in an uplink fast feedback channel, the first primary RF carrier and the second RF carrier being carriers of a same base station (BS);
means for maintaining resource allocations in the first primary RF carrier after transmitting the second message;
means for receiving a second acknowledgement message, sent from the MS via the uplink fast feedback channel, to acknowledge successful synchronization to the second RF carrier; and
means for releasing the maintained resource allocations in the first primary RF carrier in response to receiving the second acknowledgement message via the uplink fast feedback channel.

28. The apparatus of claim 27, wherein the first message further comprises information about the second RF carrier and information about a synchronization channel of the second RF carrier.

29. The apparatus of claim 28, wherein the information about the second RF carrier comprises a location of the second RF carrier in a frequency spectrum.

30. The apparatus of claim 27, further comprising:
means for stopping allocating resources for the first primary RF carrier by the BS once the BS receives the first acknowledgement message from the MS about successful reception of the first message.

31. The apparatus of claim 27, further comprising:
means for receiving at the BS a negative acknowledgement message sent from the MS using the first primary RF carrier to inform the BS about unsuccessful synchronization to the second RF carrier; and
means for continuing to maintain resource allocations for the first primary RF carrier in response to the negative acknowledgement message.

32. The apparatus of claim 27, wherein the second RF carrier is a primary RF carrier.

33. The apparatus of claim 27, wherein the second RF carrier is a secondary RF carrier.

34. An apparatus for switching from a first primary radio frequency (RF) carrier to a second RF carrier in a wireless communication system, comprising:
means for receiving a first message, sent from a base station (BS) using the first primary RF carrier, indicating a handoff to the second RF carrier and including a second portion of necessary information for handoff from the first primary RF carrier to the second RF carrier,
where the necessary information includes a first portion that has already been received and the second portion that has not yet been received;
means for transmitting a first acknowledgement message to the BS using the first primary RF carrier to acknowledge successful reception of the first message;
means for receiving a second message sent from the BS using the first primary RF carrier, wherein the second message allocates resources in the second RF carrier and allocates resources in an uplink fast feedback channel, the first primary RF carrier and the second RF carrier being carriers of the BS;
means for synchronizing to the second RF carrier; and
means for transmitting a second acknowledgement message via the uplink fast feedback channel to acknowledge successful synchronization to the second RF carrier, wherein the resources allocated at the BS on the first primary RF carrier are released in response to the transmitted second acknowledgement message.

35. The apparatus of claim 34, wherein the first message further comprises information about the second RF carrier and information about a synchronization channel of the second RF carrier.

36. The apparatus of claim 35, wherein the information about the second RF carrier comprises a location of the second RF carrier in a frequency spectrum.

37. The apparatus of claim 36, wherein the information about the second RF carrier comprises information that is different from information about the first primary RF carrier.

38. The apparatus of claim 34, wherein the second RF carrier is a primary RF carrier.

39. The apparatus of claim 34, wherein the second RF carrier is a secondary RF carrier.

40. A non-transitory computer readable medium for switching from a first primary radio frequency (RF) carrier to a second RF carrier in a wireless communication system, the non-transitory computer readable medium having instructions stored thereon, the instructions being executable by one or more processors and the instructions comprising:

instructions for transmitting a first message to a mobile station (MS) using the first primary RF carrier, the first message indicating a handoff to the second RF carrier, and including a second portion of necessary information for handoff from the first primary RF carrier to the second RF carrier, where the necessary information includes a first portion that has already been transmitted and the second portion that has not yet been transmitted;

instructions for receiving a first acknowledgement message, sent from the MS using the first primary RF carrier, to acknowledge successful reception of the first message at the MS;

instructions for transmitting a second message to the MS using the first primary RF carrier, wherein the second message allocates resources to the MS in the second RF carrier and allocates resources in an uplink fast feedback channel, the first primary RF carrier and the second RF carrier being carriers of a same base station (BS);

instructions for maintaining resource allocations in the first primary RF carrier after transmitting the second message;

instructions for receiving a second acknowledgement message, sent from the MS via the uplink fast feedback channel, to acknowledge successful synchronization to the second RF carrier; and instructions for releasing the maintained resource allocations in the first primary RF carrier in response to receiving the second acknowledgement message via the uplink fast feedback channel.

41. The non-transitory computer readable medium of claim 40, wherein the first message further comprises information about the second RF carrier and information about a synchronization channel of the second RF carrier.

42. The non-transitory computer readable medium of claim 41, wherein the information about the second RF carrier comprises a location of the second RF carrier in a frequency spectrum.

43. The non-transitory computer readable medium of claim 40, wherein instructions further comprise:

instructions for stopping allocating resources for the first primary RF carrier by the BS once the BS receives the first acknowledgement message from the MS about successful reception of the first message.

44. The non-transitory computer readable medium of claim 40, wherein instructions further comprise:

instructions for receiving at the BS a negative acknowledgement message sent from the MS using the first primary RF carrier to inform the BS about unsuccessful synchronization to the second RF carrier; and instructions for continuing to maintain resource allocations for the first primary RF carrier in response to the negative acknowledgement message.

45. The non-transitory computer readable medium of claim 40, wherein the second RF carrier is a primary RF carrier.

46. The non-transitory computer readable medium of claim 40, wherein the second RF carrier is a secondary RF carrier.

47. A non-transitory computer readable medium for switching from a first primary radio frequency (RF) carrier to a second RF carrier in a wireless communication system, the non-transitory computer readable medium having instructions stored thereon, the instructions being executable by one or more processors and the instructions comprising:

instructions for receiving a first message, sent from a base station (BS) using the first primary RF carrier, indicating a handoff to the second RF carrier and including a second portion of necessary information for handoff from the first primary RF carrier to the second RF carrier, where the necessary information includes a first portion that has already been received and the second portion that has not yet been received;

instructions for transmitting a first acknowledgement message to the BS using the first primary RF carrier to acknowledge successful reception of the first message;

instructions for receiving a second message sent from the BS using the first primary RF carrier, wherein the second message allocates resources in the second RF carrier and allocates resources in an uplink fast feedback channel, the first primary RF carrier and the second RF carrier being carriers of the BS;

instructions for synchronizing to the second RF carrier; and instructions for transmitting a second acknowledgement message via the uplink fast feedback channel to acknowledge successful synchronization to the second RF carrier, wherein resources allocated at the BS on the first primary RF carrier are released in response to the transmitted second acknowledgement message.

48. The non-transitory computer readable medium of claim 47, wherein the first message further comprises information about the second RF carrier and information about a synchronization channel of the second RF carrier.

49. The non-transitory computer readable medium of claim 48, wherein the information about the second RF carrier comprises a location of the second RF carrier in a frequency spectrum.

50. The non-transitory computer readable medium of claim 49, wherein the information about the second RF carrier comprises information that is different from information about the first primary RF carrier.

51. The non-transitory computer readable medium of claim 47, wherein the second RF carrier is a primary RF carrier.

52. The non-transitory computer readable medium of claim 47, wherein the second RF carrier is a secondary RF carrier.

* * * * *